United States Patent [19]

Merriman et al.

[11] 4,178,015

[45] Dec. 11, 1979

[54] INFLATED VEHICLE SPRING AND LIFT

[75] Inventors: Henry H. Merriman, Jackson; William J. White, Clark Lake, both of Mich.

[73] Assignee: Merriman Products, Inc., Jackson, Mich.

[21] Appl. No.: 859,819

[22] Filed: Dec. 12, 1977

[51] Int. Cl.² .............................................. B60G 11/26
[52] U.S. Cl. .................................. 280/711; 280/683; 267/65 R
[58] Field of Search ................. 280/711, 711 S, 711 R, 280/683; 267/65 R

[56] References Cited

U.S. PATENT DOCUMENTS

| 2,756,048 | 7/1956 | Pfeiffer et al. | 280/683 |
| 2,879,077 | 3/1959 | Chalmers | 280/711 |
| 2,941,816 | 6/1960 | Benson | 296/711 |
| 3,073,621 | 1/1963 | Wedzinga | 296/711 |

Primary Examiner—Richard A. Bertsch
Attorney, Agent, or Firm—Beaman & Beaman

[57] ABSTRACT

An inflatable spring for vehicle usage comprising a flexible wall tube or hose folded lengthwise upon itself to define inflatable upper and lower portions. The ends of the tube are sealed by clamping plates, and communication between the inflatable portions is established by a conduit communicating with the portions and passing through the sealed tube ends intermediate the clamping plates.

6 Claims, 6 Drawing Figures

INFLATED VEHICLE SPRING AND LIFT

BACKGROUND OF THE INVENTION

The invention pertains to inflatable springs and running gear lift devices for vehicles.

The advantages of air springs and lifters for vehicles include excellent cushioning and shock absorbing characteristics, variable control of the degree of support and quality of suspension, low cost, and adaptability, and a variety of air spring devices are commercially available for vehicle use.

One of the disadvantages of air springs presently available for use with heavy duty vehicles is the cost of such devices, and the inability to produce trouble free operation over long periods of time. The continued flexing and abrasion to which such devices are exposed often causes spring failure after a duration of usage considerably less than that achievable with mechanical vehicle suspension systems.

Air springs utilizing a plurality of inflatable compartments are known, and it is also known to form the springs of an elongated configuration, as shown in U.S. Pat. Nos. 2,756,048; 2,879,077 and 2,941,816. However, known inflatable vehicle springs of the aforementioned type are expensive since custom built molds and dies must be formed for each size and configuration, and as the size of a particular spring will vary for each model of vehicle, economics dictate that relatively high air spring production for a particular model must be achieved in order to provide a spring which is economically feasible.

BRIEF DESCRIPTION OF THE INVENTION

It is an object of the invention to provide an air spring or lift of the inflatable type for use with vehicles, such as trucks, buses, recreational vehicles, passenger cars, etc. wherein the apparatus is of a very economical construction, is dependable in operation, and air springs of various sizes may be readily manufactured from a standard inventory of components.

An additional object of the invention is to provide a vehicle air spring apparatus which is capable of extensive operational life, and is maintenance free throughout its period of use.

Yet another object of the invention is to provide an inflatable spring for vehicle suspension consisting of a pair of elongated inflated chambers wherein communication between the chambers is positively provided during all stages of inflation, and sealing and assembly of the chamber communication conduit and chamber ends is simultaneously achieved.

The air spring or lift in accord with the invention basically constitutes a flexible wall hose or tube of a deflated flattened configuration, folded over upon itself, lengthwise, defining upper and lower inflatable chambers. The ends of the hose are sealed by clamping plates, and an inflating fitting communicates with one of the chambers. In order to assure equal and simultaneous air pressure conditions within both chambers conduit communication means of an incompressable nature communicate with both chambers at the hose sealed ends. The chamber communication conduit is of a U configuration, formed of small diameter tubing, and has free ends which are inserted into the seal joint at the hose ends for surrounding by the elastomeric hose material. A single pair of clamping plates seal both of the juxtapositioned hose ends, and tightening of the bolts of the clamping plates simultaneously seals the hose ends and maintains the assembly of the chamber connecting conduit.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
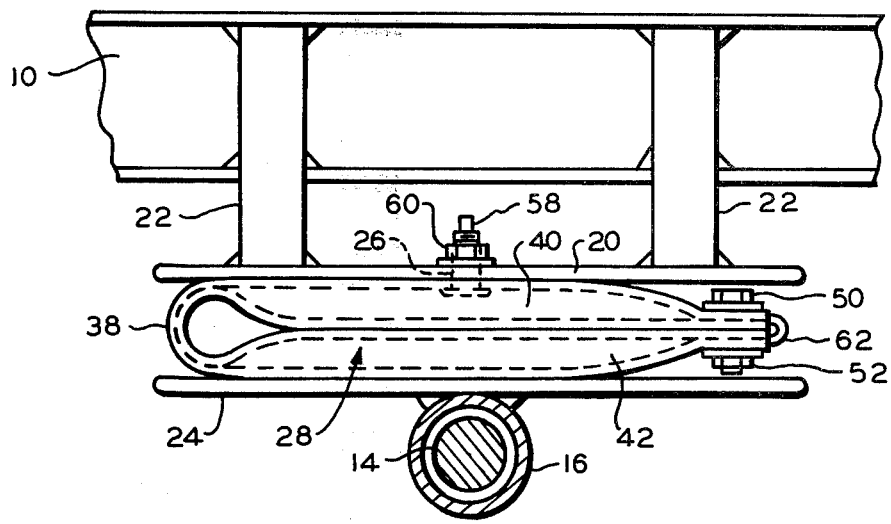
FIG. 1 is an elevational, detail view of vehicle air spring apparatus in accord with the invention.
Figure 2:
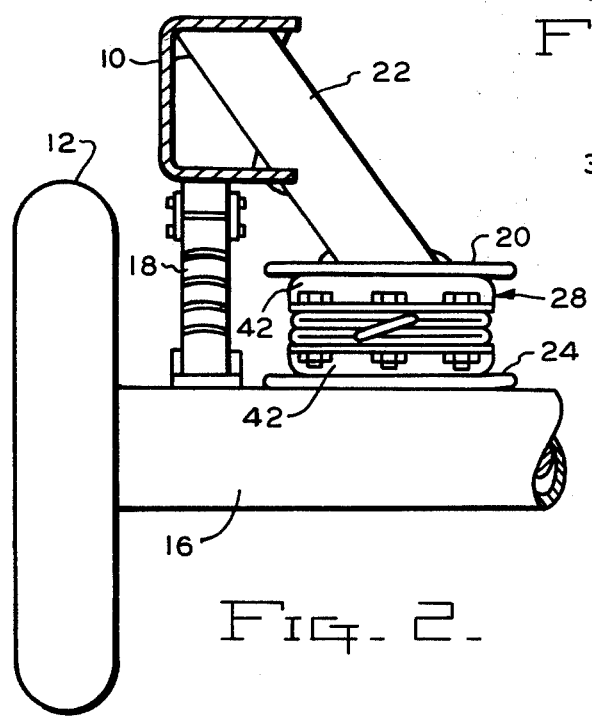
FIG. 2 is an elevational view as taken from the right of FIG. 1, illustrating the air spring of the invention and associated vehicle running gear.

The general environment and relationship of components associated with an inflatable vehicle spring or lift in accord with the invention will be appreciated from FIGS. 1 and 2. A vehicle frame channel is illustrated at 10, and the vehicle frame is supported upon a plurality of wheels, including wheel 12 having an axle 14 mounted within axle housing 16. The vehicle running gear structure may include conventional leaf spring structure 18 located between the axle housing and the frame, or, if desired, the air spring of the invention may be utilized without leaf spring structure.

In the illustrated embodiment shown in FIGS. 1 and 2, an upper air spring bracket 20 is affixed to the channel 10 by braces 22, while a lower air spring bracket 24 is attached to the axle housing 16. The brackets 20 and 24 are basically of a planar configuration having opposed flat surfaces engaging the flexible walls of the air spring of the invention, and a hole 26 is defined in the upper spring bracket for receiving the inflation valve, as will be later described.

The inflatable air spring of the invention basically consists of a length of flexible walled hose or tube 28 folded upon itself lengthwise and sealed at its ends. The hose 28 is generally of the "fire hose" type consisting of an inner tube 30 of elastomeric material, such as rubber or neoprene, covered by an outer cover 32 of woven fabric, such as nylon filaments. In this respect, the hose material is similar to that disclosed in my U.S. Pat. Nos. 3,016,884; 3,121,577 and 3,848,516.

The hose 28 is folded such that the hose ends 34 and 36 are in vertical aligned relationship to each other, and the hose ends are "squared" with respect to the axis of the hose material. The folding of the hose produces a bend at 38, wherein inflatable upper and lower chamber portions 40 and 42, respectfully, are defined, portion 40 engaging bracket 20, while portion 42 engages the axle supported bracket 24.

Figure 4:
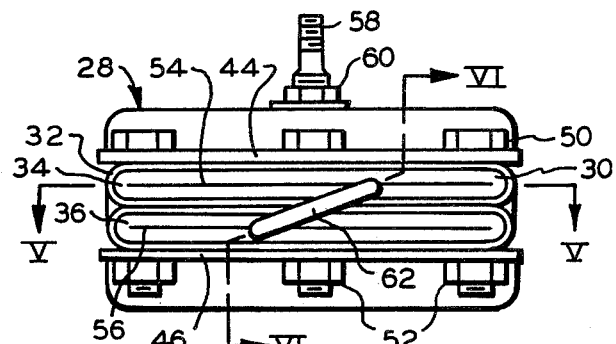
FIG. 4 is an end elevational view as taken from the right of FIG. 3.
Figure 5:
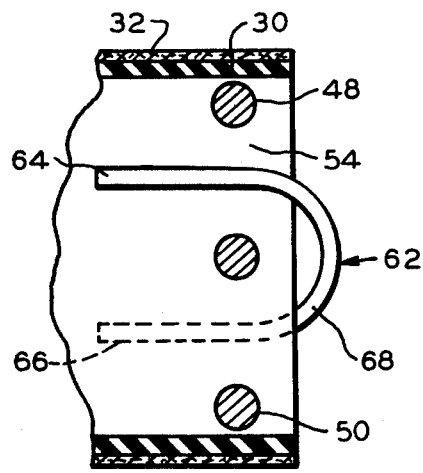
FIG. 5 is a plan, detail sectional view of the hose sealed end as taken along Section V—V of FIG. 4 and, FIG. 6 is an enlarged, detail, sectional elevational view illustrating the chamber connecting conduit as taken along Section VI—VI of FIG. 4.
Figure 6:
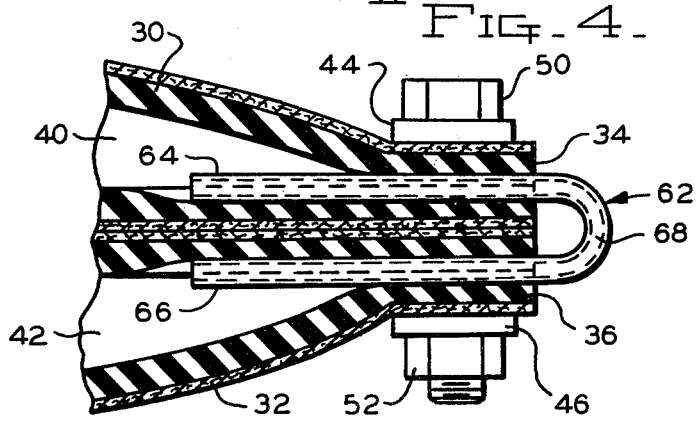

The hose ends 34 and 36 are sealed by a pair of flat clamping plates 44 and 46 mounted above and below the ends engaging the hose sides. Holes 48 defined in the hose portions adjacent the hose ends, and holes formed in plates 44 and 46, receive threaded bolts 50, the bolts being provided at one end with heads, and nut 52 at the lower end. Thus, it will be appreciated that tightening of the nuts 52 will firmly pinch the ends of the hose portions causing the opposed elastomeric tube surfaces to engage producing sealed joint lines 54 and 56, FIG. 4.

The air spring in accord with the invention is inflated by a conventional air valve 58 communicating with the upper chamber portion 40, and the air valve extends through the bracket hole 26 and receives a nut 60 wherein the air valve aids in maintaining the spring properly located relative to the brackets 20 and 24.

To insure that the chambers 40 and 42 will be equally inflated, and equally bear the supported weight, it is important that dependable communication between the chambers be maintained. As the hose is bent over upon itself at 38, chamber communication through the bend is prevented, and to internally locate a hose or tube in the bend to provide inter chamber communication results in severe chafing problems which would soon cause the spring to fail due to loss of fluid pressure. Rather, communication between chambers 40 and 42 is assured by means of a U-shaped conduit 62 formed of thin metal tubing.

Figure 3:
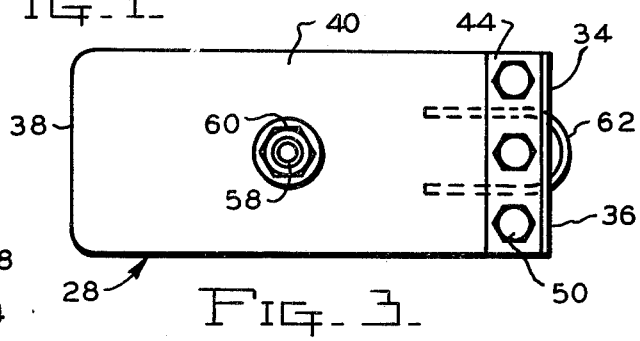
FIG. 3 is a top plan view of the spring, per se, in accord with the invention.

The conduit 62, which may comprise a copper tube, includes an upper leg portion 64 and a lower leg portion 66 interconnected by the U-shaped base 68. The upper leg portion 64 is located within the sealed joint 54, while the leg portion 66 is located with the sealed joint 56, and as will be appreciated from FIGS. 3 and 4, the conduit is so located that the center bolt 50 will pass intermediate the legs. The length of the legs 64 and 66 is such that the open ends of the conduit extends into the chambers 40 and 42 assuring the free passage of air between the chambers through the conduit 62.

Thus, when the clamping plates 44 and 46, and associated bolts 50, are initially placed upon the hose ends, the conduit 62 may be inserted in the joints 54 and 56 prior to tightening of the nuts 52. Tightening of the nuts will draw the elastomeric material of the hose inner tube 30 into close sealed relationship with the conduit legs maintaining the conduit in position by frictional engagement, and as the conduit is of a relatively small diameter the elastomeric material will sufficiently flow around the conduit to provide an effective air tight seal thereabout.

In use, the air spring is inflated with that air pressure desired as determined by the weight of the vehicle and the degree of suspension to be achieved. As known, air springs of this type may be permanently connected to a vehicle compressor for inflation and deflation during vehicle movement, and the air spring of the invention will function in the known manner.

Since the air spring is formed by a folded over portion of flexible walled hose, it will be readily appreciated that the air spring materials are of a very economical nature, and the clamping plates, bolts, conduit 62 and air valve 58 are also of such manufacture as to be economically produced. Thus, the cost of an air spring in accord with the disclosed invention is significantly less than known vehicle air springs, and as the capacity of the spring may be readily varied by merely varying the length of the spring hose, various capacities of air springs may be readily achieved by merely changing the hose length, since the clamping plate, conduit 62 and air valve will be the same regardless of the length of the spring.

It is appreciated that various modifications to the inventive concept may be apparent to those skilled in the art without departing from the scope of the invention.

We claim:

1. An inflatable air spring for vehicles having a frame mounted spring bracket and an axle mounted spring bracket comprising, in combination, a single collapsible elastomeric flexible wall tube radially expandable between inflated and deflated conditions for location between the vehicle spring brackets and having first and second ends, said tube being folded over upon itself lengthwise defining upper and lower chamber portions and said ends being disposed adjacent each other in vertical juxtaposition, clamping means disposed above and below said tube ends closing said ends in air-tight relationship defining a pair of substantially horizontal linear seal joints, a conduit establishing communication between said tube upper and lower chamber portions, said conduit extending into both of said seal joints, and an air valve communicating with one of said tube chamber portions.

2. In an inflatable air spring as in claim 1, said tube comprising a hose having an elastomeric inner tube exteriorly covered by a woven fabric cover.

3. In an inflatable air spring as in claim 1, said clamping means comprising clamping plates and fasteners interconnecting said plates drawing said plates toward each other pinching said tube ends and forcing the material of the tube into a sealing relationship with said conduit.

4. In an inflatable air spring as in claim 1, said conduit comprising a U-shaped tube having leg portions having open ends, interconnected by a base portion, said leg portions extending into different hose seal joints and in communication with the associated tube chamber portion, said base portion being exterior of said tube ends.

5. In an inflatable air spring as in claim 4, said U-shaped tube comprising a metal tube.

6. In an inflatable air spring as in claim 1, said air valve being mounted upon said upper tube chamber portion and including a threaded stem for insertion into an opening defined in the vehicle frame mounted bracket.

* * * * *